(12) United States Patent
Saito et al.

(10) Patent No.: US 11,912,215 B2
(45) Date of Patent: Feb. 27, 2024

(54) WIRE HARNESS (71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 0 days.

(21) Appl. No.: 17/989,983

(22) Filed: Nov. 18, 2022

(65) Prior Publication Data
US 2023/0166672 A1 Jun. 1, 2023

(30) Foreign Application Priority Data
Nov. 26, 2021 (JP) ................. 2021-192259

(51) Int. Cl.
B60R 16/02 (2006.01)
H02G 3/04 (2006.01)
H02G 3/32 (2006.01)

(52) U.S. Cl.
CPC .......... B60R 16/0215 (2013.01); H02G 3/04 (2013.01); H02G 3/32 (2013.01)

(58) Field of Classification Search
CPC .. H02G 3/04; H02G 3/30; H02G 3/32; H02G 3/0418; H02G 3/0468; H02G 3/0481; B60R 16/0207; B60R 16/0215; H01B 7/0045; F16L 13/1075; F16L 13/1083; F16L 13/1091
See application file for complete search history.

(56) References Cited

U.S. PATENT DOCUMENTS

| 7,740,211 | B2 * | 6/2010 | Dukes | H02G 1/08 248/74.1 |
| 9,453,593 | B2 * | 9/2016 | Pearson | F16L 3/1075 |
| 10,723,291 | B2 * | 7/2020 | Leancu | F16L 3/223 |
| 2007/0215757 | A1 * | 9/2007 | Yuta | F16L 55/035 248/68.1 |
| 2013/0240684 | A1 * | 9/2013 | Meyers | H02G 3/32 248/74.1 |
| 2019/0089142 | A1 | 3/2019 | Sugino | |
| 2020/0274343 | A1 | 8/2020 | Sugino | |

FOREIGN PATENT DOCUMENTS

JP 2019-053894 A 4/2019

* cited by examiner

Primary Examiner — Paresh Paghadal
(74) Attorney, Agent, or Firm — Oliff PLC (57) ABSTRACT A wire harness including: a wire harness main body that includes an electric wire and an exterior tube that covers an outer circumferential surface of the electric wire; a first path restrictor that is attached to an outer circumferential surface of the exterior tube and is configured to restrict a path of the wire harness main body; and an attachment that is attached to an outer circumferential surface of a portion of the first path restrictor in a lengthwise direction thereof.

8 Claims, 8 Drawing Sheets

WIRE HARNESS

BACKGROUND

The present disclosure relates to a wire harness.

Conventionally, as a wire harness for a vehicle, there has been a wire harness that includes: a wire harness main body that includes an electric wire member and an exterior member that covers the electric wire member; and a path restricting member that is attached to an outer circumferential surface of the exterior member and is configured to restrict the path of the wire harness main body (for example, see JP 2019-53894A).

SUMMARY

In the above-described wire harness, the path restricting member may be attached to an attaching member such as another path restricting member, and in such a case, it is desirable that an attaching portion between the path restricting member and the attaching member does not rattle. Note that rattling of the attaching portion may cause damage to the attaching portion due to vibration, for example.

An exemplary aspect of the disclosure provides a wire harness that is capable of suppressing rattling.

A wire harness according to the present disclosure includes: a wire harness main body that includes an electric wire and an exterior tube that covers an outer circumferential surface of the electric wire; a first path restrictor that is attached to an outer circumferential surface of the exterior tube and is configured to restrict a path of the wire harness main body; and an attachment that is attached to an outer circumferential surface of a portion of the first path restrictor in a lengthwise direction thereof, wherein: the first path restrictor is provided with an insertion port that is open in a direction orthogonal to the lengthwise direction of the first path restrictor, and extends over an entirety of the first path restrictor in the lengthwise direction thereof, and the attachment includes a cover that covers an outer circumferential surface of the first path restrictor, and an elastic portion that is positioned between the cover and at least one of the first path restrictor and the exterior tube in a compressed state.

The wire harness according to the present disclosure is capable of suppressing rattling.

DETAILED DESCRIPTION OF EMBODIMENTS

Description of Embodiments of Present Disclosure

First, embodiments of the present disclosure will be listed and described.

A wire harness according to the present disclosure is

[1] a wire harness including: a wire harness main body that includes an electric wire member and an exterior member that covers an outer circumferential surface of the electric wire member; a first path restricting member that is attached to an outer circumferential surface of the exterior member and is configured to restrict a path of the wire harness main body; and an attaching member that is attached to an outer circumferential surface of a portion of the first path restricting member in a lengthwise direction thereof. The first path restricting member is provided with an insertion port that is open in a direction orthogonal to the lengthwise direction of the first path restricting member, and extends over an entirety of the first path restricting member in the lengthwise direction thereof, and the attaching member includes a covering portion that covers an outer circumferential surface of the first path restricting member, and an elastic portion that is positioned between the covering portion and at least one of the first path restricting member and the exterior member in a compressed state.

With this configuration, the attaching member includes a covering portion that covers an outer circumferential surface of the first path restricting member, and an elastic portion that is positioned between the covering portion and at least one of the first path restricting member and the exterior member in a compressed state. Therefore, the first path restricting member is held by the covering portion in a state of being pressed by the at least one elastic portion. As a result, for example, rattling of the covering portion and the first path restricting member is suppressed compared to a configuration in which the covering portion is constituted by a receiving portion and a lid, the lid is formed integrally with the receiving portion with a thin hinge portion being interposed therebetween, and the lid is simply locked to the receiving portion as a result of claw portions engaging with each other in a closed state. That is to say, in a configuration with the thin hinge portion and the claw portions, rattling is likely to occur between the receiving portion and the lid at the thin hinge portion and the claw portions, and accordingly rattling is likely to occur between the covering portion and the first path restricting member. However, it is possible to prevent such rattling from occurring. Therefore, it is possible to suppress rattling between the first path restricting member and the attaching member.

[2] It is preferable that the elastic portion is provided as a plurality of elastic portions arranged in a circumferential direction of the covering portion.

With this configuration, a plurality of elastic portions are provided in the circumferential direction of the covering portion. Therefore, the first path restricting member is held by the covering portion in the state of being pressed by the at least one elastic portion at a plurality of positions. Therefore, for example, it is possible to further suppress rattling between the first path restricting member and the attaching member.

[3] It is preferable that the elastic portion is an integrally molded part that is made of the same material as the covering portion.

With this configuration, the elastic portion is an integrally molded part that is made of the same material as the covering portion. Therefore, it is possible to suppress an increase in the number of parts and make production easier.

[4] It is preferable that the elastic portion constitutes a detent configured to prevent the first path restricting member from rotating in a circumferential direction thereof relative to the covering portion by engaging with the insertion port in the circumferential direction of the first path restricting member.

With this configuration, the elastic portion constitutes a detent, and therefore the first path restricting member is prevented from rotating in the circumferential direction thereof relative to the covering portion.

[5] It is preferable that the elastic portion is made of metal.

With this configuration, the elastic portion is made of metal, and therefore it is possible to press against at least one of the first path restricting member and the exterior member with a strong force, for example.

[6] It is preferable that the elastic portion is a metal plate that is deformable and is configured to be brought into, and kept in, either one of a first state in which the elastic portion is bent so as to protrude outward in a radial direction of the covering portion, and a second state in which the elastic portion is bent so as to protrude inward in a radial direction of the covering portion, and is positioned between the covering portion and at least one of the first path restricting member and the exterior member in the second state, in a compressed state.

With this configuration, it is possible to manufacture the wire harness by positioning the first path restricting member inside the covering portion and thereafter elastically deforming the elastic portion from the first state to the second state, and it is easier to manufacture the wire harness.

[7] It is preferable that the covering portion includes a receiving portion that covers a portion of the first path restricting member in a circumferential direction thereof, and a lid that is fixed to the receiving portion and covers an entirety of the first path restricting member in the circumferential direction thereof, together with the receiving portion.

With this configuration, the covering portion includes the receiving portion and the lid, and therefore, for example, the covering portion can be retrofitted to the first path restricting member. As a result, compared to a case in which the covering portion has a non-deformable tubular shape, for example, it is easier to perform work to assemble the wire harness.

[8] It is preferable that the attaching member is a second path restricting member that is attached to the outer circumferential surface of the exterior member and is configured to restrict the path of the wire harness main body, and the covering portion is provided at an end portion of the second path restricting member in a lengthwise direction thereof, and covers an outer circumferential surface of an end portion of the first path restricting member in the lengthwise direction thereof.

With this configuration, the covering portion is provided at an end portion of the second path restricting member in the lengthwise direction thereof and covers the outer circumferential surface of an end portion of the first path restricting member in the lengthwise direction thereof. Therefore, the first path restricting member and the second path restricting member are coupled to each other in the lengthwise direction thereof. Therefore, the path of the wire harness main body is continuously restricted by the first path restricting member and the second path restricting member.

[9] It is preferable that the first path restricting member is configured to restrict a path of a straight section that is included in the path of the wire harness main body, and the second path restricting member is configured to restrict a path of a bent section that is included in the path of the wire harness main body.

With this configuration, the path of the straight section is restricted by the first path restricting member, and the path of the bent section is restricted by the second path restricting member. As a result, the path of the straight section and the path of the bent section of the wire harness are continuously restricted from deviating from the respective desired paths thereof.

Details of Embodiments of Present Disclosure

The following describes specific examples of a wire harness according to the present disclosure with reference to the drawings. In each drawing, for convenience of explanation, some parts of the configuration may be exaggerated or simplified. In addition, the dimensional ratio of each part may differ in each drawing. The terms "parallel" and "orthogonal" in the present specification are not limited to being strictly parallel and orthogonal, but may be substantially parallel and orthogonal within the range in which the actions and effects of the embodiments can be exhibited. It should be noted that the present disclosure is not limited to these examples, and is indicated by the scope of claims, and is intended to include all modifications within the meaning and scope equivalent to the scope of claims.

Overall Configuration of Wire Harness 10

Figure 1:
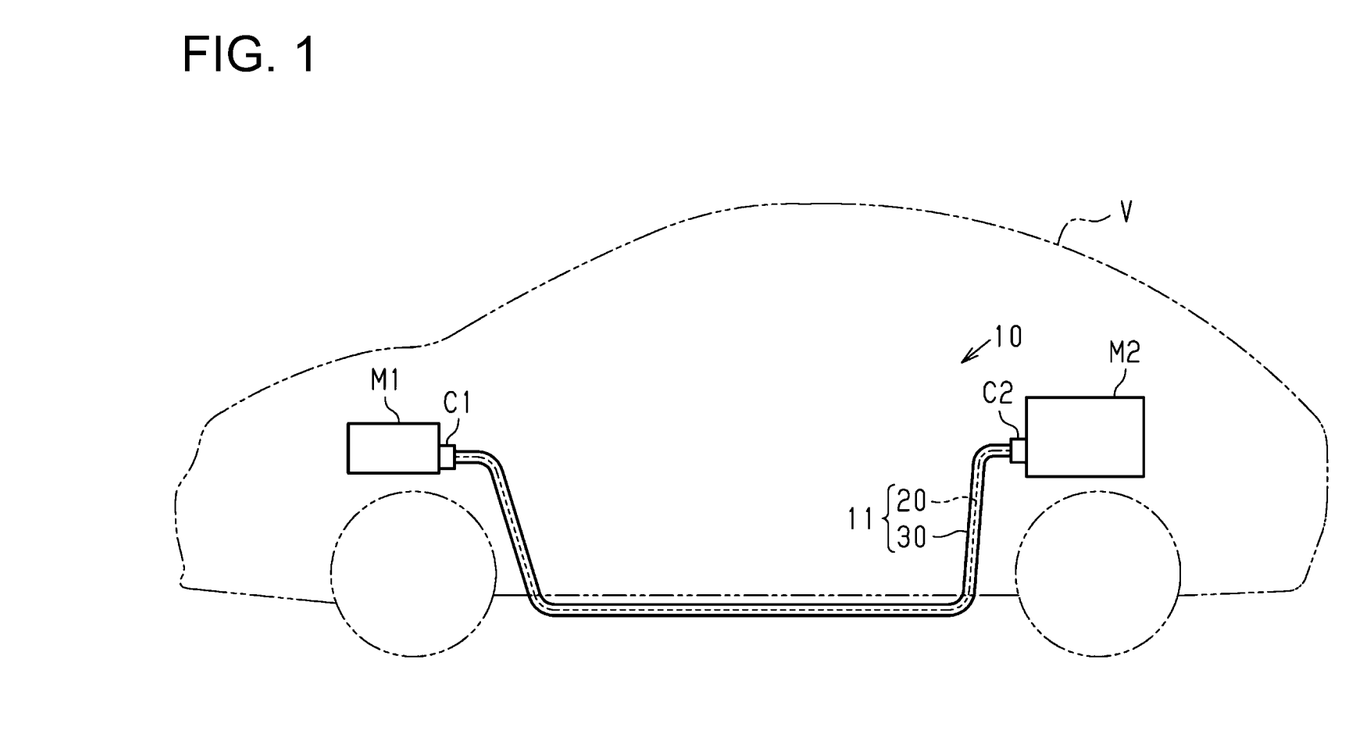
FIG. 1 is a schematic configuration diagram showing a wire harness according to an embodiment.

A wire harness 10 shown in FIG. 1 is to be mounted in a vehicle V such as a hybrid vehicle or an electric vehicle, for example. The wire harness 10 electrically connects two or more on-board devices to each other. The on-board devices are electric devices mounted in the vehicle V. The wire harness 10 electrically connects, for example, an inverter M1 that is installed in a front portion of the vehicle V and a high-voltage battery M2 that is installed rearward of the inverter M1 in the vehicle V, to each other. The wire harness 10 is formed in an elongated shape so as to extend in a front-rear direction of the vehicle V, for example. The wire harness 10 is routed in the vehicle V so that, for example, an intermediate portion of the wire harness 10 in the lengthwise direction thereof passes outside the vehicle interior such as under the floor of the vehicle V.

The inverter M1 is, for example, connected to a motor (not shown) for driving wheels, which serves as a power source when the vehicle travels. The inverter M1 generates AC power from the DC power of the high-voltage battery M2, and supplies the AC power to a motor. The high-voltage battery M2 is, for example, a battery that is capable of supplying a voltage of several hundred volts.

The wire harness 10 includes a wire harness main body 11. The wire harness main body 11 includes an electric wire member 20 (electric wire) and a tubular exterior member 30 (exterior tube) that covers the outer circumferential surface of the electric wire member 20. The wire harness 10 has connectors C1 and C2 that are respectively attached to two end portions of the electric wire member 20. One end portion of the electric wire member 20 in the lengthwise direction thereof is connected to the inverter M1 via the connector C1, and the other end portion of the electric wire member 20 in the lengthwise direction thereof is connected to the high-voltage battery M2 via the connector C2.

Figure 2:
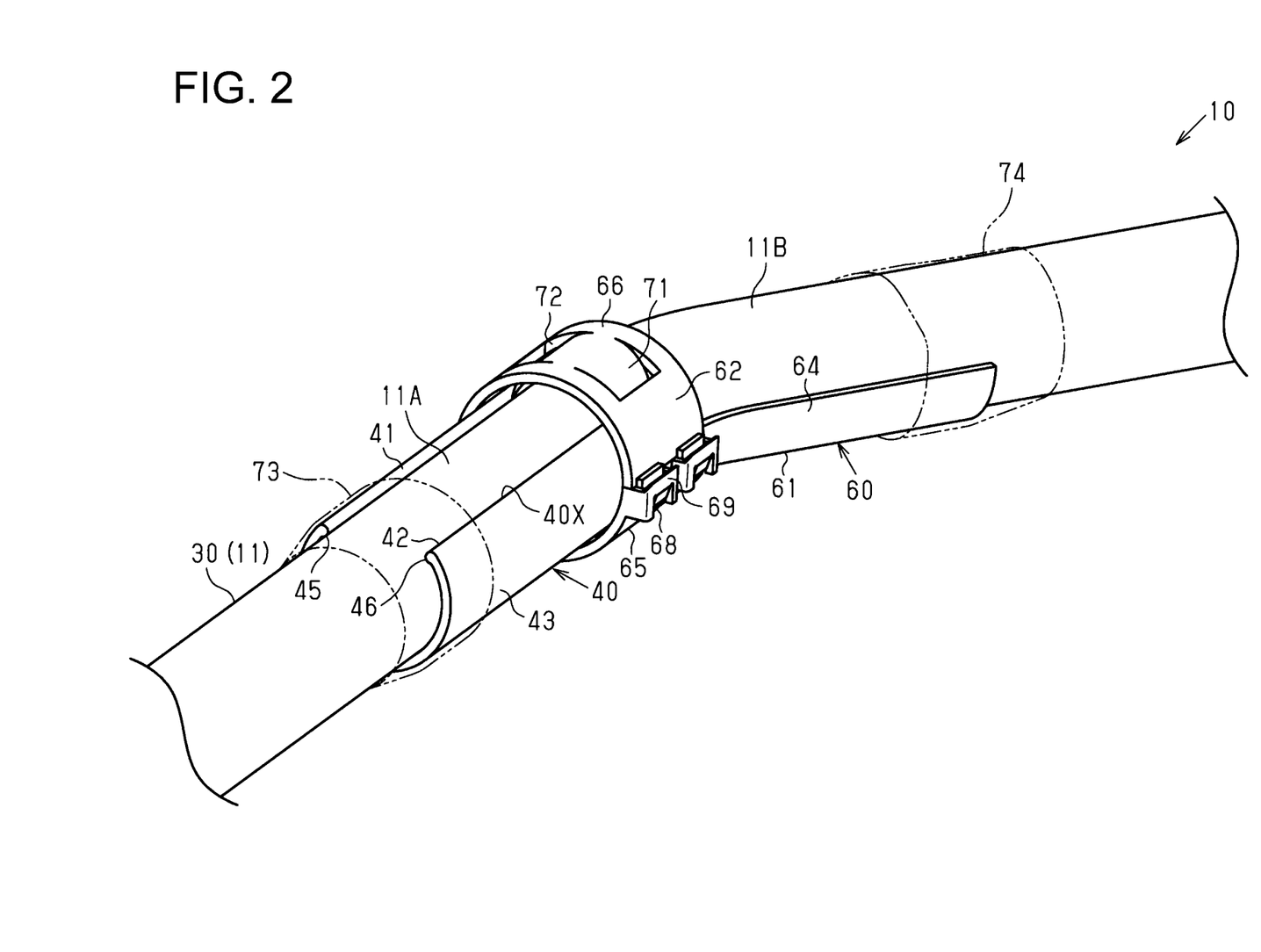
FIG. 2 is a schematic perspective view showing a wire harness according to an embodiment.
Figure 3:
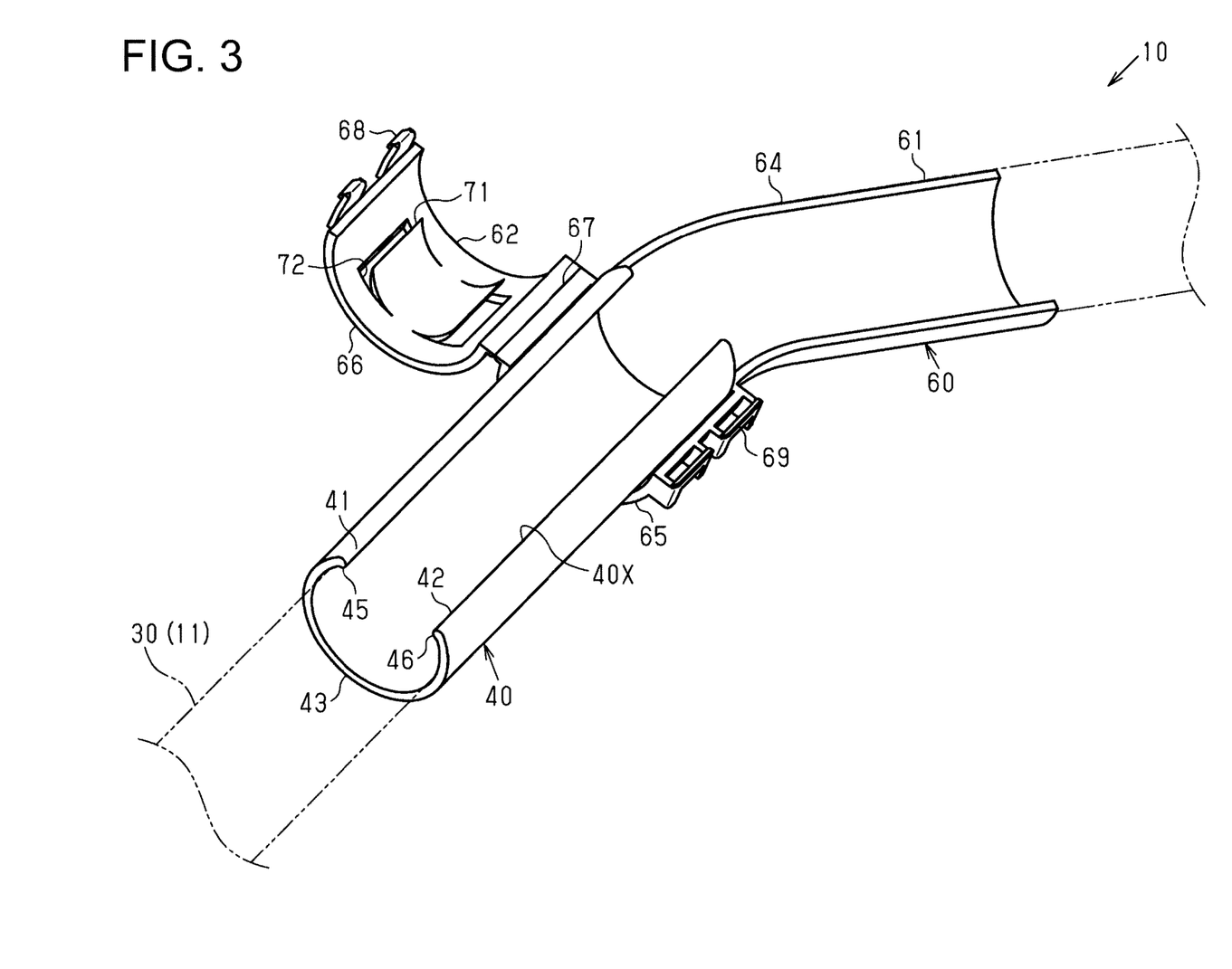
FIG. 3 is a schematic perspective view showing a wire harness according to an embodiment.

As shown in FIGS. 2 and 3, the wire harness 10 includes a first path restricting member 40 (first path restrictor) that is attached to the outer circumferential surface of the exterior member 30 and a second path restricting member 60 (second path restrictor) that is attached to the outer circumferential surface of the exterior member 30 and serves as the attaching member (attachment). The first path restricting member 40 and the second path restricting member 60 restrict the path along which the wire harness main body 11 is routed. Note that the first path restricting member 40 and the second path restricting member 60 are omitted from FIG. 1.

Configuration of Electric Wire Member 20

Figure 4:
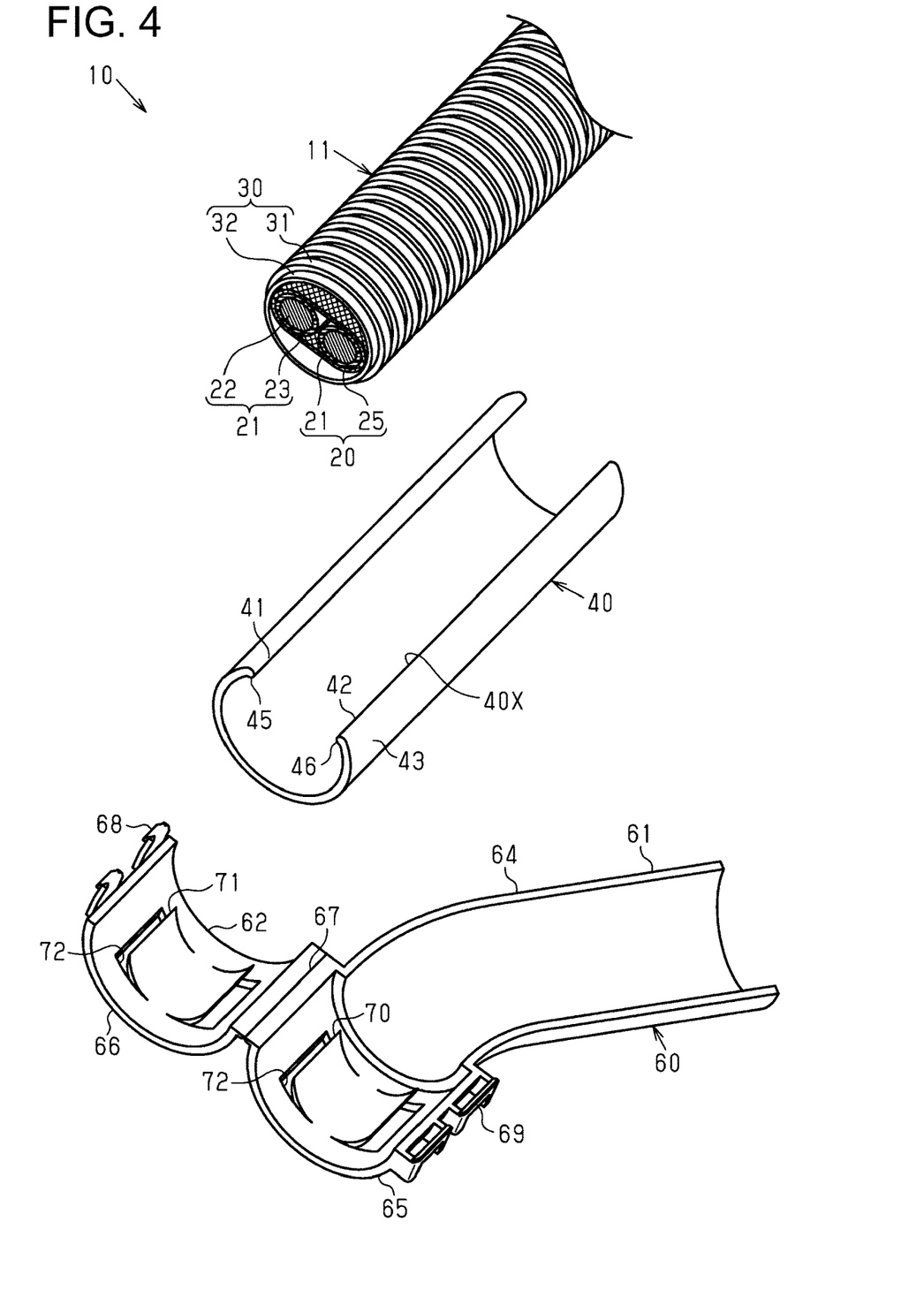
FIG. 4 is a schematic exploded perspective view showing a wire harness according to an embodiment.
Figure 5:
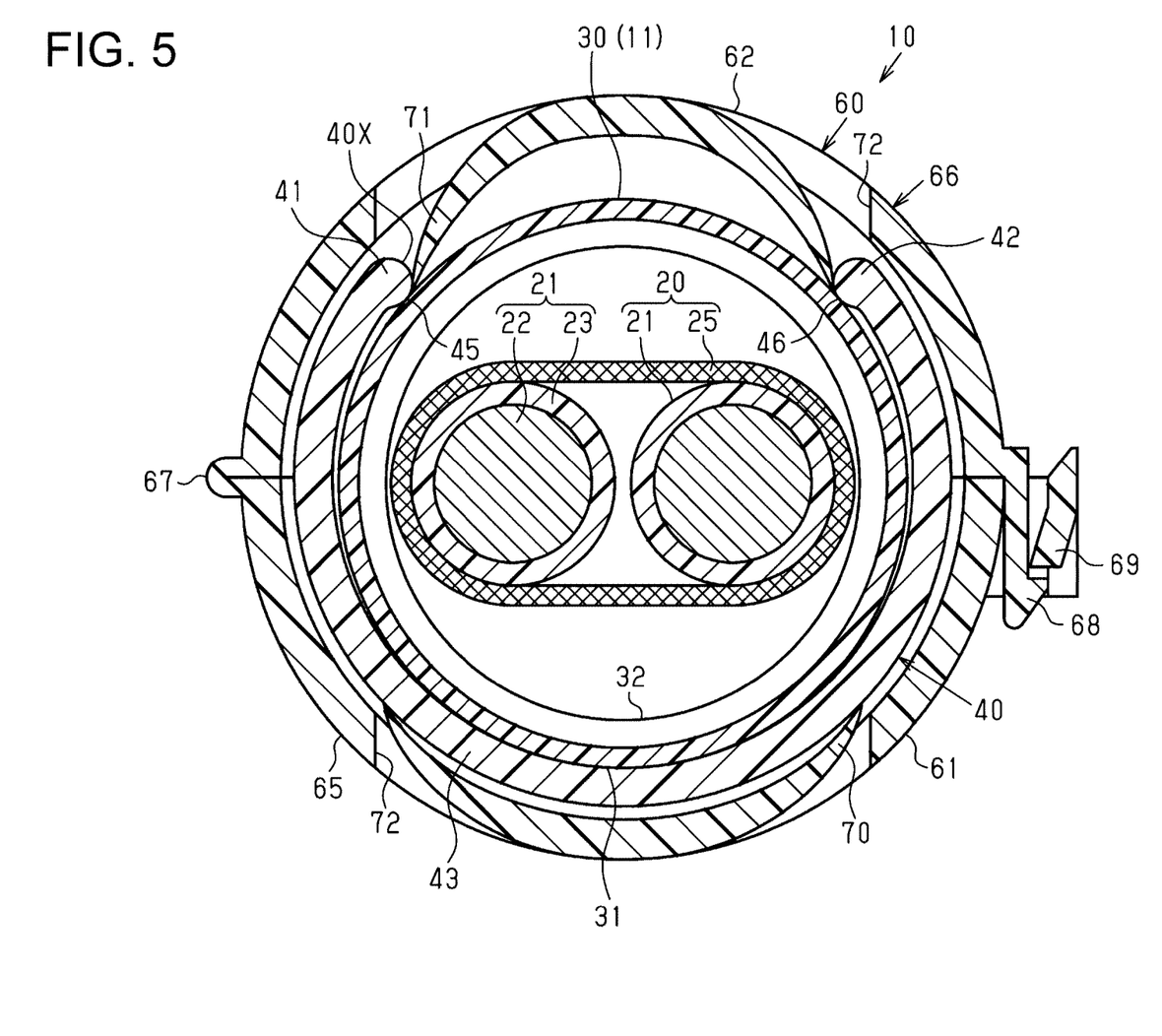
FIG. 5 is a schematic horizontal cross-sectional view showing a wire harness according to an embodiment.

As shown in FIGS. 4 and 5, for example, the electric wire member 20 includes one or more electric wires 21, specifically two electric wires 21 in the present embodiment, and a braided member 25 that collectively encloses the outer circumferential surfaces of the plurality of electric wires 21.

As shown in FIG. 5, each electric wire 21 is a coated electric wire that includes a conductive core wire 22 and an insulating coating 23 that encloses the outer circumferential surface of the core wire 22 and has insulating properties. Each electric wire 21 is, for example, a high-voltage electric wire that supports a high voltage and a large current. Each electric wire 21 may be, for example, a non-shielded electric wire that does not have an electromagnetic shield structure therewith, or a shielded electric wire that has an electromagnetic shield structure therewith. Each electric wire 21 in the present embodiment is a non-shielded electric wire.

As the core wire 22, a stranded wire that is constituted by a plurality of metal strands twisted together, a single core wire that is constituted by a single conductor, or the like may be used, for example. As the single core wire, a columnar conductor that is constituted by one columnar metal rod with a solid internal structure, a tubular conductor with a hollow internal structure, or the like may be used, for example. As the core wire 22, a combination of a stranded wire, a columnar conductor, or a tubular conductor may be used. As the material of the core wire 22, a metal material such as a copper-based material or an aluminum-based material may be used, for example.

The insulating coating 23 covers, for example, all the way around the outer circumferential surface of the core wire 22. The insulating coating 23 is constituted by, for example, a resin material that has insulating properties.

The cross-sectional shape of each wire 21 cut along a plane that is orthogonal to the lengthwise direction of each wire 21, i.e., the lateral cross-sectional shape of each wire 21, may be any shape. The lateral cross-sectional shape of each electric wire 21 may be, for example, a circular shape, a semi-circular shape, a polygonal shape, a square shape, a flat shape, or the like. The lateral cross-sectional shape of each electric wire 21 in the present embodiment is a circular shape.

The braided member 25 has, for example, a tubular shape that collectively encloses the outer circumferential surfaces of the plurality of electric wires 21. As the braided member 25, a braided wire in which a plurality of metal strands are braided or a braided wire in which metal strands and resin strands are braided in combination with each other may be used, for example. As the material of the metal strands, a metal material such as a copper-based material or an aluminum-based material may be used, for example. Although not shown in the drawings, the two end portions of the braided member 25 in the lengthwise direction are grounded at, for example, the connectors C1 and C2 (see FIG. 1).

Configuration of Exterior Member 30

As shown in FIG. 4, the exterior member 30 has a tubular shape that encloses all the way around the outer circumferential surface of the electric wire member 20. The exterior member 30 in the present embodiment is formed in a cylindrical shape. The exterior member 30 is, for example, provided with a circumferential wall that is formed so as to be continuous all the way around the circumferential surface of the exterior member 30. The exterior member 30, for example, seals the inside of the exterior member 30 all the way around the circumferential surface thereof. The exterior member 30 has, for example, a function of protecting the electric wire member 20 from flying objects and water droplets.

The exterior member 30 is, for example, flexible and easy to bend. Examples of the flexible exterior member 30 include a resin corrugated tube and a rubber waterproof cover. The exterior member 30 in the present embodiment is a resin corrugated tube that has a bellowed shape in which the diameter repeatedly increases and decreases in the lengthwise direction of the exterior member 30. That is to say, the exterior member 30 in the present embodiment has a bellowed structure in which large-diameter portions 31 and small-diameter portions 32 that have a smaller diameter than the large-diameter portions 31 are alternately provided in the lengthwise direction of the exterior member 30. The large-diameter portions 31 and the small-diameter portions 32 each have an annular shape that extends around the exterior member 30 in the circumferential direction thereof, for example. As the material of the exterior member 30, a synthetic resin such as polyolefin, polyamide, polyester, or an ABS resin may be used, for example. In FIGS. 1 to 3, the exterior member 30 is simplified in order to simplify the drawings.

Configurations of First Path Restricting Member 40 and Second Path Restricting Member 60

As shown in FIGS. 2 and 3, the first path restricting member 40 and the second path restricting member 60 each hold the exterior member 30. The first path restricting member 40 and the second path restricting member 60 are each more rigid than the exterior member 30, for example. Compared to the outer member 30, the first path restricting member 40 and the second path restricting member 60 are each more rigid so as to be less bendable in a direction orthogonal to the lengthwise direction of the wire harness main body 11. With this configuration, the first path restricting member 40 and the second path restricting member 60 each restrict the path of the wire harness main body 11. For example, the first path restricting member 40 and the second path restricting member 60 each assist the exterior member 30 so that the wire harness main body 11 does not bend under its own weight or the like and does not deviate from a desired path.

As shown in FIG. 2, the first path restricting member 40 is provided along a portion of the wire harness main body 11 in the lengthwise direction thereof. For example, the first path restricting member 40 is attached to the outer circumferential surface of the exterior member 30 along a straight section 11A, which is a straight section of the path of the wire harness main body 11. The first path restricting member 40 is configured to restrict the path of the wire harness main body 11 in the straight section 11A. Here, the straight section 11A is a section in which the path of the wire harness main body 11 extends straight in one direction. Note that one or more first path restricting members 40 are provided depending on the path of the wire harness main body 11.

The second path restricting member 60 is provided along a portion of the wire harness main body 11 in the lengthwise direction thereof. For example, the second path restricting member 60 is attached to the outer circumferential surface of the exterior member 30 along a bent section 11B, which is a bent section of the path of the wire harness main body 11. The second path restricting member 60 is configured to restrict the path of the wire harness main body 11 in the bent section 11B. Here, the bent section 11B is a section in which the path of the wire harness main body 11 is bent so as to deviate from a straight line. Note that one or more second path restricting members 60 may be provided depending on the path of the wire harness main body 11.

Configuration of First Path Restricting Member 40

As shown in FIG. 5, the first path restricting member 40 covers a portion of the outer circumferential surface of the exterior member 30 in the circumferential direction of the exterior member 30. The first path restricting member 40 has a shape that covers a portion of the outer circumferential surface of the exterior member 30 in the circumferential direction thereof. The first path restricting member 40 has a C-like horizontal cross-sectional shape as a whole. For example, the first path restricting member 40 covers a range larger than half of the outer circumferential surface of the exterior member 30. That is to say, the first path restricting member 40 covers a range larger than half of the outer circumferential of the exterior member 30 in the circumferential direction of the exterior member 30. As shown in FIG. 2, the first path restricting member 40 extends along the straight section 11A in the lengthwise direction of the exterior member 30. For example, the first path restricting member 40 is formed in a shape that extends straight in one direction. For example, the horizontal cross-sectional shape of the first path restricting member 40 is uniform over the entirety of the first path restricting member 40 in the lengthwise direction thereof.

The first path restricting member 40 is made of metal or resin, for example. The first path restricting member 40 in the present embodiment is made of resin. As the material of the first path restricting member 40, a synthetic resin such as polypropylene, polyamide, or polyacetal may be used, for example. The first path restricting member 40 may be manufactured using a well-known manufacturing method such as extrusion molding or injection molding, for example. In the present embodiment, the first path restricting member 40 is an extrusion-molded part manufactured through extrusion molding. Therefore, it is easy to manufacture the first path restricting member 40 by using an extrusion molding machine that extrudes the raw material of the first path restricting member 40 in the lengthwise direction thereof. Also, it is possible to manufacture a plurality of types of first path restricting members 40 with different sizes in the lengthwise direction thereof by using a single extrusion molding machine. For example, it is possible to manufacture a plurality of types of first path restricting members 40 with different sizes in the lengthwise direction thereof by cutting the base material of the first path restricting member 40 formed using a single extrusion molding machine, at any desired length, using a cutting machine.

The path restricting member 40 is provided with an insertion port 40X that is open in a direction orthogonal to the lengthwise direction of the path restricting member 40. The insertion port 40X extends over the entirety of the first path restricting member 40 in the lengthwise direction thereof. The first path restricting member 40 includes a first end portion 41 and a second end portion 42 that are two end portions of the first path restricting member 40 in the circumferential direction thereof and define the insertion port 40X. The first path restricting member 40 includes a coupling portion 43 that couples the first end portion 41 and the second end portion 42 to each other. In other words, the first path restricting member 40 includes a coupling portion 43 that is formed so as to cover a portion of the exterior member 30 in the circumferential direction thereof, the first end portion 41 and the second end portion 42 that are provided at two end portions of the coupling portion 43, and the insertion port 40X that is defined by the first end portion 41 and the second end portion 42.

As shown in FIG. 5, the coupling portion 43 constitutes a main portion of the first path restricting member 40. The thickness of the coupling portion 43 in a radial direction is uniform in the circumferential direction of the first path restricting member 40, for example. The horizontal cross-sectional shape of the coupling portion 43 is a shape that matches the outer surface of the exterior member 30. For example, the first end portion 41, the second end portion 42, and the coupling portion 43 each have an arc-like horizontal cross-sectional shape.

The first end portion 41 and the second end portion 42 are provided opposite to each other in the circumferential direction of the first path restricting member 40. The first end portion 41 and the second end portion 42 are separated from each other in the circumferential direction of the first path restricting member 40 with the insertion port 40X being interposed therebetween. In other words, the gap between the first end portion 41 and the second end portion 42 in the circumferential direction of the first path restricting member 40 is provided as the insertion port 40X. As described above, the first path restricting member 40 is formed in a C shape in which the insertion port 40X is provided at a portion of the first path restricting member 40 in the circumferential direction thereof.

The respective leading ends of the first end portion 41 and the second end portion 42 each have a curved horizontal cross-sectional shape. The respective leading ends of the first end portion 41 and the second end portion 42 in the present embodiment each have a circular arc horizontal cross-sectional shape.

The first path restricting member 40 includes a protruding portion 45 that protrudes from the inner surface of the first end portion 41, and a protruding portion 46 that protrudes from the inner surface of the second end portion 42. The protruding portions 45 and 46 each protrude toward the exterior member 30 inserted into the first path restricting member 40, and come into contact with the outer surface of the exterior member 30. The protruding portions 45 and 46 each come into contact with the outer surfaces of the large-diameter portions 31 of the exterior member 30. For example, the protruding portion 45 protrudes from the inner surface of the leading end of the first end portion 41. For example, the protruding portion 46 protrudes from the inner surface of the leading end of the second end portion 42. For example, the protruding portions 45 and 46 each have a curved horizontal cross-sectional shape. The protruding portions 45 and 46 in the present embodiment each have a circular arc horizontal cross-sectional shape.

As shown in FIG. 3, the protruding portions 45 and 46 extend in the lengthwise direction of the first path restricting member 40. For example, the protruding portions 45 and 46 each extend over the full length of the first path restricting member 40 in the lengthwise direction thereof.

The protruding portions 45 and 46 each press the exterior member 30 from the outside of the exterior member 30. The exterior member 30 is elastically held by the protruding portion 45, the protruding portion 46, and the coupling portion 43. As a result, the first path restricting member 40 is firmly coupled to the exterior member 30.

As shown in FIG. 5, the opening width of the insertion port 40X, i.e., the shortest distance between the first end portion 41 and the second end portion 42, is smaller than the outer diameter of the exterior member 30.

The opening width of the insertion port 40X increases as a result of the first path restricting member 40 elastically deforming. For example, the opening width of the insertion port 40X increases as a result of the exterior member 30 being inserted into the insertion port 40X in a direction orthogonal to the lengthwise direction of the first path restricting member 40. When the exterior member 30 is inserted into the first path restricting member 40, the first path restricting member 40 elastically deforms to return to the original shape thereof. As a result, the opening width of the insertion port 40X becomes smaller than the outer diameter of the exterior member 30, and the first path restricting member 40 is attached to the outer circumferential surface of the exterior member 30.

Configuration of Second Path Restricting Member 60

As shown in FIG. 2, the second path restricting member 60 is attached to the outer circumferential surface of a portion of the first path restricting member 40 in the lengthwise direction thereof. The second path restricting member 60 is attached to the outer circumferential surface of an end portion of the first path restricting member 40 in the lengthwise direction thereof. The second path restricting member 60 is attached to the outer circumferential surface of the exterior member 30 in the bent section 11B. The second path restricting member 60 extends in the lengthwise direction of the exterior member 30 in the bent section 11B. The second path restricting member 60 is bent along the shape of the bent section 11B, for example.

The second path restricting member 60 includes a second path restricting main body 61 and a lid 62.

The second path restricting member 60 is made of metal or resin, for example. The second path restricting member 60 in the present embodiment is made of resin. As the material of the second path restricting member 60, a synthetic resin such as polypropylene, polyamide, or polyacetal may be used, for example. The second path restricting member 60 may be manufactured using a well-known manufacturing method such as injection molding, for example.

The second path restricting main body 61 includes a main body portion 64 and a receiving portion 65 (receiver). In the present embodiment, the receiving portion 65 and the lid 62 constitute a covering portion 66.

The main body portion 64 covers a portion of the outer circumferential surface of the exterior member 30 in the circumferential direction of the exterior member 30. The main body portion 64 has a shape that covers a portion of the outer circumferential surface of the exterior member 30 in the circumferential direction of the exterior member 30. The main body portion 64 has a semi-cylindrical horizontal cross-sectional shape as a whole. The main body portion 64 covers half of the outer circumference of the exterior member 30. As shown in FIG. 2, the main body portion 64 extends in the lengthwise direction of the exterior member 30 in the bent section 11B. The main body portion 64 is bent along the shape of the bent section 11B.

The receiving portion 65 is provided at an end portion of the second path restricting member 60 in the lengthwise direction thereof, which is an end portion of the main body portion 64 in the lengthwise direction thereof. The receiving portion 65 covers a portion of the outer circumferential surface of the first path restricting member 40 in the circumferential direction of the first path restricting member 40. The receiving portion 65 covers a portion in a circumferential direction of an end portion of the first path restricting member 40 in the lengthwise direction thereof. The receiving portion 65 covers a portion of the outer circumferential surface of the first path restricting member 40 in the circumferential direction of the first path restricting member 40. The receiving portion 65 has a semi-cylindrical horizontal cross-sectional shape as a whole. The receiving portion 65 has a semi-cylindrical shape with a diameter larger than that of the main body portion 64. The receiving portion 65 covers half of the outer circumference of the first path restricting member 40.

The receiving portion 65 and the lid 62 are formed as an integrally molded part that is made of the same material. That is to say, the second path restricting member 60 in the present embodiment is an integrally molded part of which the entirely including the second path restricting main body 61 and the lid 62 is made of the same material. The lid 62 is coupled to the receiving portion 65 with a thin hinge portion 67 being interposed therebetween. Specifically, the other end portion of the lid 62 in the circumferential direction thereof is coupled one end portion of the receiving portion 65 in the circumferential direction thereof with the thin hinge portion 67 being interposed therebetween. The lid 62 is rotatable about the hinge portion 67 relative to the receiving portion 65. The covering portion 66 is deformable so as to be in a closed state in which the receiving portion 65 and the lid 62 are closed and an open state in which the receiving portion 65 and the lid 62 are open. The covering portion 66 covers an outer circumferential surface of the first path restricting member 40 in a closed state.

The lid 62 is provided with claw portions 68. The receiving portion 65 is provided with engagement-target portions 69 with which the claw portions 68 can engage. Specifically, the engagement-target portions 69 are provided on the other end portion of the receiving portion 65 in the circumferential direction thereof. The claw portions 68 are provided on one end portion of the lid 62 in the circumferential direction thereof. The claw portions 68 engage with the engagement-target portions 69 when the covering portion 66 is in a closed state. The lid 62 is fixed to the receiving portion 65 so as to be non-rotatable as a result of the claw portions 68 engaging with the engagement-target portions 69. Specifically, the receiving portion 65 and the lid 62 are made non-rotatable when the claw portions 68 engage with the engagement-target portions 69, and the covering portion 66 is kept in a closed state.

The lid 62 covers the entirety of the first path restricting member 40 in the circumferential direction thereof, together with the receiving portion 65. Specifically, when the covering portion 66 is in a closed state, the lid 62 covers all the way around the outer circumferential surface of the first path restricting member 40 in the circumferential direction thereof, together with the receiving portion 65. The lid 62 in the present embodiment covers a portion of the outer circumferential surface of the first path restricting member 40 and the portion of the outer circumferential surface of the exterior member 30 exposed from the insertion port 40X. The lid 62 has a semi-cylindrical horizontal cross-sectional shape as a whole. The lid 62 has a semi-cylindrical shape with the same diameter as the diameter of the receiving portion 65. The lid 62 covers a portion not covered by the receiving portion 65, of the outer circumferential surface of the first path restricting member 40 in the circumferential direction thereof, which corresponds to half of the range of the outer circumferential surface of the first path restricting member 40 in the circumferential direction thereof.

As shown in FIG. 5, the second path restricting member 60 is provided with elastic portions 70 and 71 positioned between the covering portion 66 and at least one of the first path restricting member 40 and the exterior member 30 in a compressed state.

Specifically, a plurality of elastic portions 70 and 71 are provided in the circumferential direction of the covering portion 66. Two elastic portions, 70 and 71, are provided. One elastic portion 70 is provided on the receiving portion 65. The other elastic portion 71 is provided on the lid 62. The elastic portions 70 and 71 are provided at an interval of 180° in the circumferential direction of the covering portion 66. One elastic portion 70 is provided in a central portion of the receiving portion 65 in the circumferential direction thereof. The other elastic portion 71 is provided in a central portion of the lid 62 in the circumferential direction thereof. As shown in FIG. 4, the elastic portions 70 and 71 are provided in a central portion of the covering portion 66 in the lengthwise direction thereof. The elastic portions 70 and 71 are formed as an integrally molded part that is made of the same material as the covering portion 66, i.e., the receiving portion 65 and the lid 62.

The one elastic portion 70 is constituted by a pair of elastic pieces that protrude from a central portion of the inner surface of the receiving portion 65 in the circumferential direction thereof toward the two ends in the circumferential direction thereof, while protruding inward in a radial direction of the receiving portion 65. The other elastic portion 71 is constituted by a pair of elastic pieces that protrude from a central portion of the inner surface of the lid 62 in the circumferential direction thereof toward the two ends in the circumferential direction thereof, while protruding inward in a radial direction of the lid 62. In addition, each of the elastic portions 70 and 71 has a shape in which the thickness thereof decreases in a direction toward the protruding leading end thereof. The one elastic portion 70 and the other elastic portion 71 have the same shape in the unloaded and unflexed state. Note that the receiving portion 65 and the lid 62 are provided with die-cutting holes 72 at portions corresponding to the elastic portions 70 and 71, so that manufacturing using a mold is facilitated.

The other elastic portion 71 constitutes a detent configured to prevent the first path restricting member 40 from rotating in the circumferential direction thereof relative to the covering portion 66 by engaging with the insertion port 40X in the circumferential direction of the first path restricting member 40. The other elastic portion 71 engages with the insertion port 40X in the circumferential direction of the first path restricting member 40 as a result of the leading end portion thereof moving to the insertion port 40X along the outer circumferential surface of the exterior member 30 while the state of the covering portion 66 is changed from an opening state to the closed state. Note that the other elastic portion 71 becomes difficult to bend further when the leading end thereof engages with the insertion port 40X, and therefore, when the covering portion 66 is in a closed state, the one elastic portion 70 bends more than the other elastic portion 71. When the covering portion 66 is in a closed state, the one elastic portion 70 is positioned between the receiving portion 65 and the first path restricting member 40 in a compressed state. When the covering portion 66 is in a closed state, the other elastic portion 71 is positioned between the lid 62 and the exterior member 30 in a compressed state.

Also, as shown in FIG. 2, the wire harness 10 is provided with a slide restricting member 73 that is configured to restrict the first path restricting member 40 from sliding in the lengthwise direction of the exterior member 30, for example. The wire harness 10 is provided with a slide restricting member 74 that is configured to restrict the second path restricting member 60 from sliding in the lengthwise direction of the exterior member 30, for example. Resin or metal band ties, caulking rings, adhesive tapes, or the like may be used as the slide restricting members 73 and 74, for example. The slide restricting members 73 and 74 in the present embodiment are pieces of adhesive tape. The slide restricting member 73 is wound around the end portion that is not coupled to the second path restricting member 60, of the first path restricting member 40, and the exterior member 30. The slide restricting member 74 is wound around the end portion that is not coupled to the first path restricting member 40, of the second path restricting member 60, and the exterior member 30.

Next, actions of the present embodiment will be described.

The elastic portions 70 and 71 are positioned between the covering portion 66 of the second path restricting member 60 and at least one of the first path restricting member 40 and the exterior member 30, in a compressed state. Therefore, the receiving portion 65 and the lid 62 that constitute the covering portion 66 is kept in the state of sandwiching the first path restricting member 40. Therefore, the state in which the first path restricting member 40 and the second path restricting member 60 are coupled to each other is kept unchanged. Therefore, the path of the wire harness main body 11 is continuously restricted.

Next, effects of the above-described embodiment will be descried below.

(1) Elastic portions 70 and 71 that are positioned between the covering portion 66 that covers the outer circumferential surface of the first path restricting member 40 and at least one of the first path restricting member 40 and the exterior member 30 in a compressed state are provided. Therefore, the first path restricting member 40 is held by the covering portion 66 in the state of being pressed by the elastic portions 70 and 71. As a result, for example, rattling of the covering portion 66 and the first path restricting member 40 is suppressed compared to a configuration in which the lid 62 is formed integrally with the receiving portion 65 with a thin hinge portion 67 being interposed therebetween, and the lid 62 is simply locked to the receiving portion 65 as a result of claw portions 68 engaging with each other in a closed state. That is to say, in a configuration with the thin hinge portion 67 and the claw portions 68, rattling is likely to occur between the receiving portion 65 and the lid 62 at the thin hinge portion 67 and the claw portions 68, and accordingly rattling is likely to occur between the covering portion 66 and the first path restricting member 40. However, it is possible to prevent such rattling from occurring. Therefore, it is possible to suppress rattling between the first path restricting member 40 and the second path restricting member 60. As a result, for example, it is possible to prevent the attaching portion between the first path restricting member 40 and the second path restricting member 60 from being damaged, and accordingly it is possible to reliably restrict the path of the wire harness main body 11.

(2) A plurality of elastic portions 70 and 71 are provided in the circumferential direction of the covering portion 66. Therefore, the first path restricting member 40 is held by the covering portion 66 in the state of being pressed by the elastic portions 70 and 71 at a plurality of positions. Therefore, for example, it is possible to further suppress rattling between the first path restricting member 40 and the second path restricting member 60.

(3) The elastic portions 70 and 71 are formed as an integrally molded part that is made of the same material as the covering portion 66. Therefore, it is possible to suppress an increase in the number of parts and make production easier.

(4) The elastic portion 71 constitutes a detent, and therefore the first path restricting member 40 is prevented from rotating in the circumferential direction thereof relative to the covering portion 66.

(5) The covering portion 66 includes the receiving portion 65 and the lid 62, and therefore, for example, the covering portion 66 can be retrofitted to the first path restricting member 40. As a result, compared to a case in which the covering portion 66 has a non-deformable tubular shape, for example, it is easier to perform work to assemble the wire harness 10.

(6) The attaching member attached to the first path restricting member 40 is the second path restricting member 60 attached to the outer circumferential surface of the exterior member 30 and is configured to restrict the path of the wire harness main body 11. The covering portion 66 is provided at an end portion of the second path restricting member 60 in the lengthwise direction thereof and covers the outer circumferential surface of an end portion of the first path restricting member 40 in the lengthwise direction thereof. Therefore, the first path restricting member 40 and the second path restricting member 60 are coupled to each other in the lengthwise direction thereof. Therefore, the path of the wire harness main body 11 is continuously restricted by the first path restricting member 40 and the second path restricting member 60.

(7) The first path restricting member 40 is configured to restrict the path of the straight section 11A of the wire harness main body 11, and the second path restricting member 60 is configured to restrict the path of the bent section 11B of the wire harness main body 11. As a result, the path of the straight section 11A and the path of the bent section 11B of the wire harness main body 11 are continuously restricted from deviating from the respective desired paths thereof.

OTHER EMBODIMENTS

The above embodiment can be modified and implemented as follows. The above embodiment and the following modifications can be implemented in combination with each other as long as no contradiction arises.

In the above-described embodiment, each of the elastic portions 70 and 71 is constituted by a pair of elastic pieces that protrude inward in a radial direction of the covering portion 66. However, the shape thereof may be changed.

Figure 6:
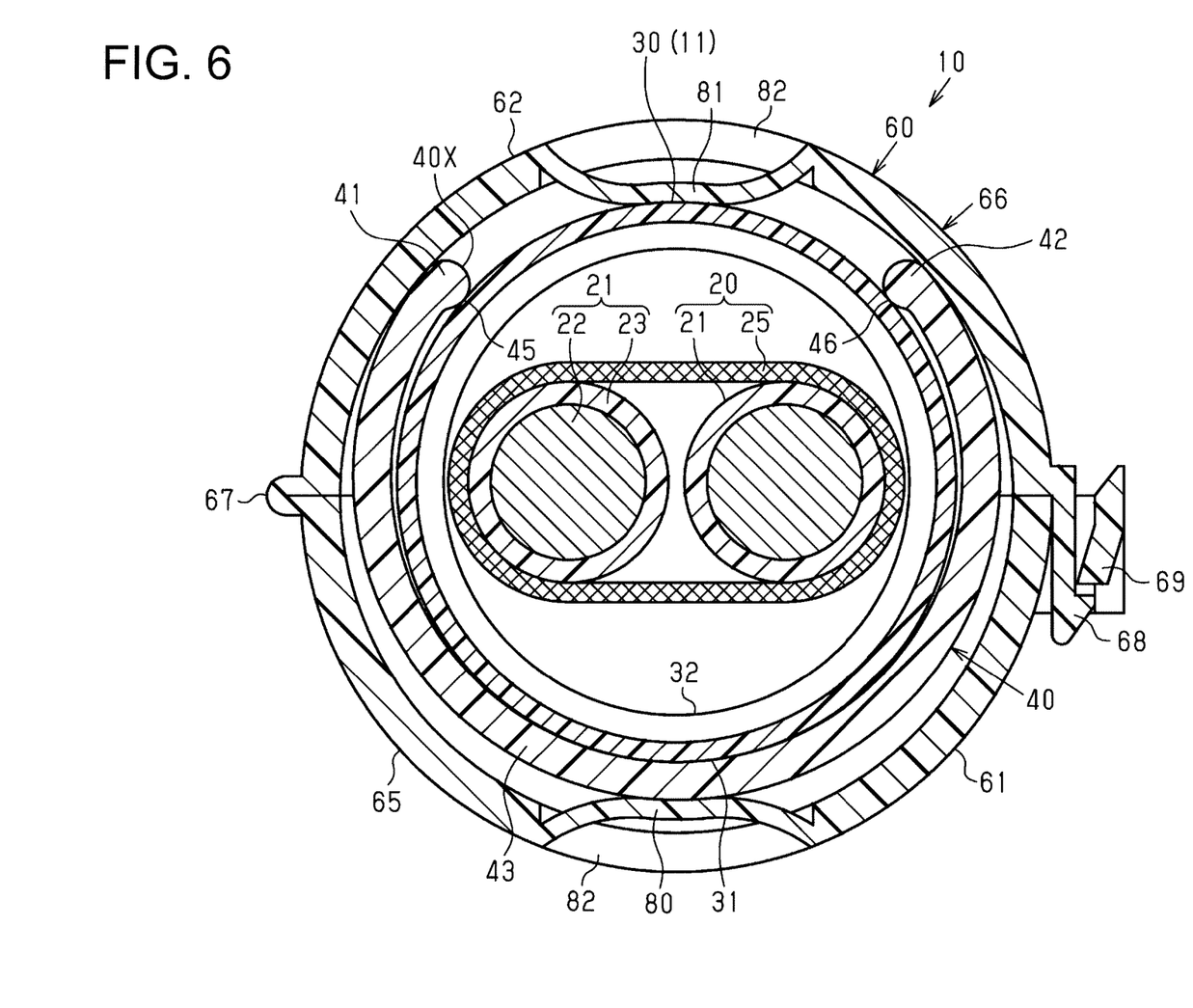
FIG. 6 is a schematic horizontal cross-sectional view showing a wire harness according to a modified example.

For example, the shape may be changed as shown in FIG. 6. One elastic portion 80 in this example is thinner than the other portions of the receiving portion 65 and protrudes from a central portion of the receiving portion 65 in the circumferential direction thereof while curving inward in a radial direction of the receiving portion 65. The other elastic portion 81 in this example is thinner than the other portions of the lid 62 and protrudes from a central portion of the lid 62 in the circumferential direction thereof while curving inward in a radial direction of the lid 62. The one elastic portion 80 and the other elastic portion 81 have the same shape in the unloaded and unflexed state. The receiving portion 65 and the lid 62 are provided with die-cutting holes 82 at portions corresponding to the elastic portions 80 and 81, so that manufacturing using a mold is facilitated. The one elastic portion 80 is positioned between the receiving portion 65 and the first path restricting member 40 in a compressed state. The other elastic portion 81 is positioned between the lid 62 and the exterior member 30 in a compressed state. With such a configuration, it is also possible to suppress rattling between the first path restricting member 40 and the second path restricting member 60.

In the above-described embodiment, the elastic portions 70 and 71 are formed as an integrally molded part that is made of the same material as the covering portion 66. However, the present disclosure is not limited to such a configuration, and the elastic portions 70 and 71 may be made of a material different from that of the covering portion 66, or may be separate parts.

Figure 7:
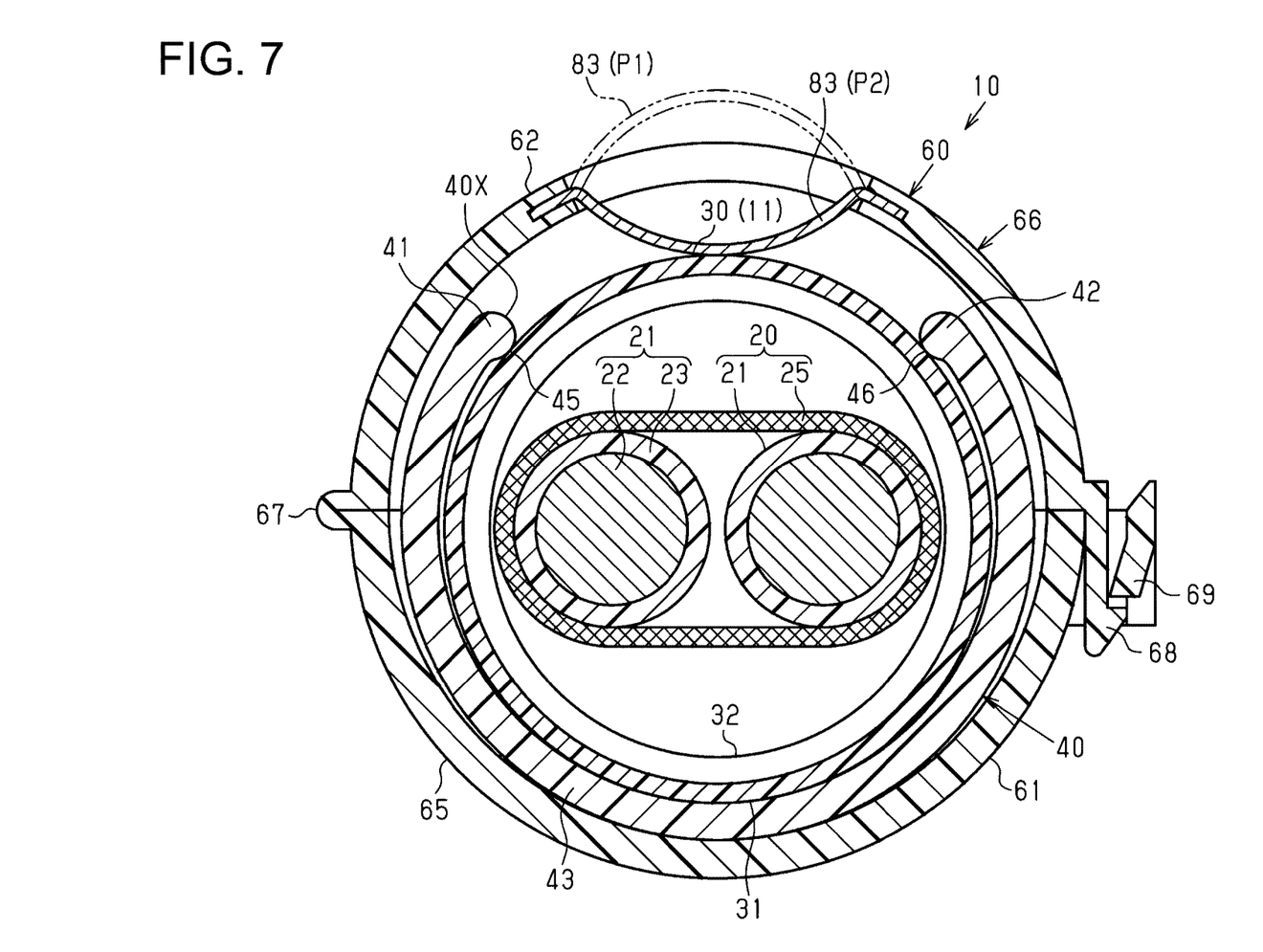
FIG. 7 is a schematic horizontal cross-sectional view showing a wire harness according to a modified example.

For example, the configuration may be changed as shown in FIG. 7. An elastic portion 83 in this example is made of metal. The elastic portion 83 is a metal plate that is elastically deformable and is configured to be brought into, and kept in, either one of a first state P1 in which the elastic portion 83 is bent so as to protrude outward in a radial direction of the covering portion 66, and a second state P2 in which the elastic portion 83 is bent so as to protrude inward in a radial direction of the covering portion 66. That is to say, when an external force is applied outward in a redial direction of the covering portion 66 in the second state P2, the elastic portion 83 is brought into the first state P1 in which the elastic portion 83 is bent so as to protrude outward in a radial direction of the covering portion 66, and is kept in the state. Also, when an external force is applied inward in a redial direction of the covering portion 66 in the first state P1, the elastic portion 83 is brought into the second state P2 in which the elastic portion 83 is bent so as to protrude inward in a radial direction of the covering portion 66, and is kept in the state. For example, the elastic portion 83 is in the first state P1 when the covering portion 66 is in an open state, and is in the second state P2 after the covering portion 66 is brought into a closed state. As a result, in the second state P2, the elastic portion 83 is positioned between the covering portion 66 and at least one of the first path restricting member 40 and the exterior member 30 in a compressed state. The elastic portion 83 in this example is provided on the lid 62, and is positioned between the covering portion 66 and the exterior member 30 in a compressed state. In addition, the elastic portion 83 in this example is insert-molded in the lid 62 so that the two end portions thereof are embedded in the lid 62.

With such a configuration, the elastic portion 83 is made of metal, and therefore it is possible to press against at least one of the first path restricting member 40 and the exterior member 30 with a strong force, for example. Also, for example, it is possible to manufacture the wire harness 10 by positioning the first path restricting member 40 inside the covering portion 66 and thereafter elastically deforming the elastic portion 83 from the first state P1 to the second state P2, and it is easier to manufacture the wire harness 10.

Figure 8:
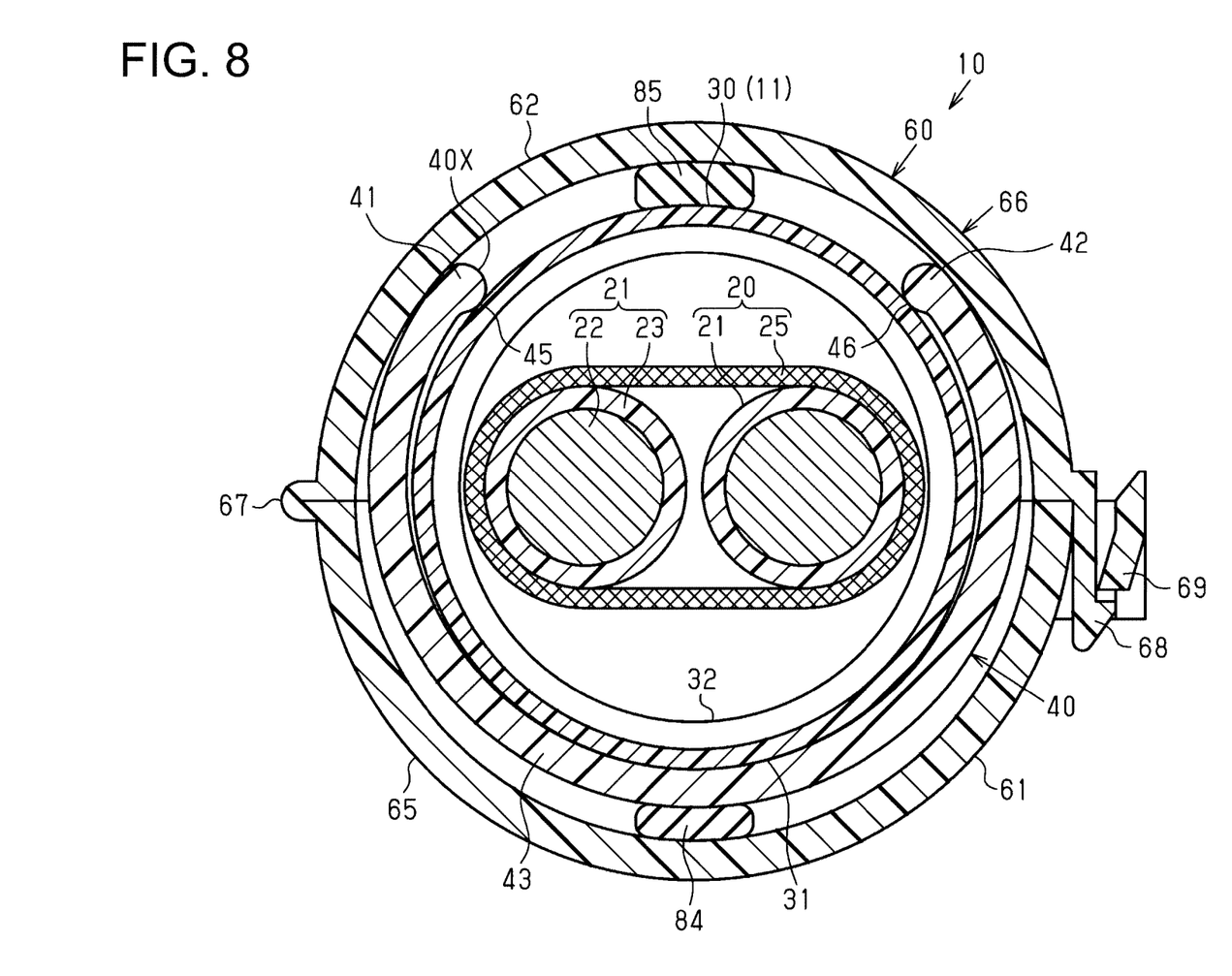
FIG. 8 is a schematic horizontal cross-sectional view showing a wire harness according to a modified example.

In addition, the configuration may be changed as shown in FIG. 8. Elastic portions 84 and 85 in this example are made of rubber. One elastic portion 84 in this example is interposed between the receiving portion 65 and the first path restricting member 40 and is positioned in a compressed state. The other elastic portion 85 in this example is interposed between the lid 62 and the exterior member 30 and is positioned in a compressed state. With such a configuration, it is also possible to suppress rattling between the first path restricting member 40 and the second path restricting member 60. Note that the elastic portions 84 and 85 may be changed to, for example, metal leaf springs, compression coil springs, or the like.

In the above-described embodiment, two elastic portions 70 and 71 are provided in the circumferential direction of the covering portion 66. However, the present disclosure is not limited to such a configuration, and the configuration may be changed to a configuration in which one or three or more elastic portions are provided.

In the above-described embodiment, the elastic portion 71 constitutes a detent that engages with the insertion port 40X in the circumferential direction of the first path restricting member 40. However, the present disclosure is not limited to such a configuration, and a configuration in which the elastic portion 71 does not engage with the insertion port 40X.

In the above-described embodiment, the covering portion 66 includes the receiving portion 65 and the lid 62. However, the present disclosure is not limited to such a configuration, and the configuration may be changed to a configuration in which the covering portion 66 has a tubular shape that cannot be disassembled or deformed. Also, regarding the receiving portion 65 and the lid 62, the lid 62 is formed integrally with the receiving portion 65 with the thin hinge portion 67 being interposed therebetween, and the lid 62 is locked to the receiving portion 65 as a result of the claw portions 68 engaging with each other in a closed state. However, the configuration may be changed with a receiving portion 65 and a lid 62 that are fixed using another structure.

The second path restricting member 60 in the above-described embodiment is formed so as to restrict the path of the bent section 11B of the wire harness main body 11. However, the present disclosure is not limited to such a configuration. For example, the shape of the second path restricting member 60 may be changed so as to restrict the path of the straight section 11A of the wire harness main body 11. In the second path restricting member 60 in this case, for example, the bent shape in the main body portion 64 is changed to a straight shape.

In the above-described embodiment, an attaching member attached to the first path restricting member 40 is embodied as the second path restricting member 60. However, the present disclosure is not limited to such a configuration. For example, the attaching member may be embodied as a vehicle attaching member that is used to attach the first path restricting member 40 to the vehicle V.

The structure of the first path restricting member 40 in the above-described embodiment may be changed as appropriate. For example, as long as the first path restricting member 40 has the insertion port 40X and is configured to be attachable to the outer circumferential surface of the exterior member 30, other configurations are not specifically limited.

The protruding portion 45 in the above-described embodiment may be provided further away from the insertion port 40X than the leading end of the first end portion 41 in the circumferential direction of the first path restricting member 40.

The protruding portion 46 in the above-described embodiment may be provided further away from the insertion port 40X than the leading end of the second end portion 42 in the circumferential direction of the first path restricting member 40.

The protruding portions 45 and 46 in the above-described embodiment may be provided on a portion of the first path restricting member 40 in the lengthwise direction thereof.

At least either one of the protruding portions 45 and 46 in the above-described embodiment may be omitted.

The first path restricting member 40 in the above-described embodiment may be configured so that the thickness of the coupling portion 43 in a radial direction thereof varies in the circumferential direction.

The shape of the coupling portion 43 of the first path restricting member 40 in the above-described embodiment is not limited to an arc shape, and may be changed to an ellipsoidal arc shape, a U shape, or the like, for example.

In the above-described embodiment, the first path restricting member 40 and the second path restricting member 60 are more rigid than the exterior member 30. However, the present disclosure is not limited to such a configuration, and the first path restricting member 40 and the second path restricting member 60 may be as rigid as the exterior member 30, or less rigid than the exterior member 30. That is to say, it is only necessary that the first path restricting member 40 and the second path restricting member 60 make the wire harness main body 11 less bendable than when the first path restricting member 40 and the second path restricting member 60 are not attached to the wire harness main body 11.

For example, the exterior member 30 in the above-described embodiment may be a resin corrugated tube with a metal layer that contains a metal material, formed on the outer surface thereof.

The exterior member 30 in the above-described embodiment is not limited to being a corrugated tube, and may be an exterior member that is not provided with a large-diameter portions 31 or a small-diameter portions 32, for example.

The exterior member 30 in the above-described embodiment may have a slit that extends in the lengthwise direction of the exterior member 30.

Although the electric wires 21 in the above-described embodiment are high-voltage electric wires, the present disclosure is not limited to such a configuration. For example, the electric wires 21 may be low-voltage electric wires.

In the electric wire member 20 in the above-described embodiment, an electromagnetic shield member is embodied as the braided member 25. However, the present disclosure is not limited to such a configuration. For example, the electromagnetic shield member in the electric wire member 20 may be embodied as a metal foil.

The braided member 25 of the electric wire member 20 in the above-described embodiment may be omitted.

In the above-described embodiment, the number of electric wires 21 included in the electric wire member 20 is two. However, the present disclosure is not limited to such a configuration. The number of electric wires 21 may be one or three or more.

The positional relationship between the inverter M1 and the high-voltage battery M2 in the vehicle V is not limited to that in the above-described embodiment, and may be changed as appropriate depending on the vehicle configuration.

In the above-described embodiment, a plurality of on-board devices to which the wire harness 10 is to be electrically connected are embodied as the inverter M1 and the high-voltage battery M2. However, the present disclosure is not limited to such a configuration. The plurality of on-board devices to which the wire harness 10 is to be electrically connected are not particularly limited as long as they are electric devices to be mounted in the vehicle V.

The embodiments disclosed herein are illustrative in all aspects and should not be considered restrictive. The scope of the present disclosure is indicated by the scope of claims, not the above-mentioned meaning, and is intended to include all modifications within the meaning and scope equivalent to the scope of claims.

What is claimed is:

1. A wire harness comprising:
a wire harness main body that includes an electric wire and an exterior tube that covers an outer circumferential surface of the electric wire;
a first path restrictor that is attached to an outer circumferential surface of the exterior tube and restricts a path of the wire harness main body; and
an attachment that is attached to an outer circumferential surface of a portion of the first path restrictor in a lengthwise direction thereof, wherein
the first path restrictor is provided with an insertion port that is open in a direction orthogonal to the lengthwise direction of the first path restrictor, and extends over an entirety of the first path restrictor in the lengthwise direction thereof,
the attachment includes a cover that covers an outer circumferential surface of the first path restrictor, and an elastic portion that is positioned between the cover and at least one of the first path restrictor and the exterior tube in a compressed state,
the cover includes a hole, and each end of the elastic portion is attached to the cover at different sides of the hole, and
the elastic portion is a metal plate that is deformable and is brought into, and kept in, either one of:
(i) a first state in which the elastic portion is bent so as to protrude outward in a radial direction through the hole of the cover; and
(ii) a second state in which the elastic portion is bent so as to protrude inward in a radial direction through the hole of the cover, and is positioned between the cover and at least one of the first path restrictor and the exterior tube in the second state, in a compressed state.

2. The wire harness according to claim 1, wherein the elastic portion is provided as a plurality of elastic portions arranged in a circumferential direction of the cover.

3. The wire harness according to claim 1, wherein the elastic portion is an integrally molded part that is made of a same material as the cover.

4. The wire harness according to claim 1, wherein the elastic portion is a detent that prevents the first path restrictor from rotating in a circumferential direction thereof relative to the cover by engaging with the insertion port in the circumferential direction of the first path restrictor.

5. The wire harness according to claim 1, wherein the elastic portion is made of metal.

6. The wire harness according to claim 1, wherein the cover includes a receiver that covers a portion of the first path restrictor in a circumferential direction thereof, and a lid that is fixed to the receiver and covers an entirety of the first path restrictor in the circumferential direction thereof, together with the receiver.

7. The wire harness according to claim 1, wherein:
the attachment is a second path restrictor that is attached to the outer circumferential surface of the exterior tube and restricts the path of the wire harness main body, and
the cover is provided at an end of the second path restrictor in a lengthwise direction thereof, and covers an outer circumferential surface of an end of the first path restrictor in the lengthwise direction thereof.

8. The wire harness according to claim 7, wherein:
the first path restrictor is configured to restrict a path of a straight section that is included in the path of the wire harness main body, and
the second path restrictor restricts a path of a bend that is included in the path of the wire harness main body.

* * * * *